United States Patent
Mulligan et al.

(10) Patent No.: US 11,673,055 B2
(45) Date of Patent: Jun. 13, 2023

(54) SYSTEM AND METHOD OF CHALLENGE GENERATION

(71) Applicant: Sony Interactive Entertainment Europe Limited, London (GB)

(72) Inventors: Paul Terence Mulligan, London (GB); Ashley Sanders, London (GB); Andrew John Nicholas Jones, London (GB)

(73) Assignee: Sony Interactive Entertainment Europe Limited

( * ) Notice: Subject to any disclaimer, the term of this patent is extended or adjusted under 35 U.S.C. 154(b) by 0 days.

(21) Appl. No.: 16/814,190

(22) Filed: Mar. 10, 2020

(65) Prior Publication Data
US 2020/0298127 A1 Sep. 24, 2020

(30) Foreign Application Priority Data
Mar. 18, 2019 (GB) .................... 1903644

(51) Int. Cl.
A63F 13/67 (2014.01)
A63F 13/46 (2014.01)
A63F 13/58 (2014.01)
A63F 13/79 (2014.01)

(52) U.S. Cl.
CPC .............. *A63F 13/67* (2014.09); *A63F 13/46* (2014.09); *A63F 13/58* (2014.09); *A63F 13/79* (2014.09)

(58) Field of Classification Search
CPC .......... A63F 13/67; A63F 13/46; A63F 13/58; A63F 13/79
See application file for complete search history.

(56) References Cited

U.S. PATENT DOCUMENTS

| | | | |
|---|---|---|---|
| 2009/0253517 | A1 | 10/2009 | Bererton et al. |
| 2011/0281638 | A1* | 11/2011 | Bansi .................. A63F 13/69 463/23 |
| 2013/0288757 | A1 | 10/2013 | Guthridge et al. |
| 2014/0066176 | A1 | 3/2014 | LeTourneau et al. |
| 2016/0121218 | A1 | 5/2016 | Allen et al. |

(Continued)

FOREIGN PATENT DOCUMENTS

| | | |
|---|---|---|
| EP | 2878346 A1 | 6/2015 |
| WO | 2013184258 A1 | 12/2013 |

OTHER PUBLICATIONS

Extended European Search Report including Written Opinion for Application No. EP20160600.1, dated Jul. 24, 2020, pp. 1-7.

(Continued)

*Primary Examiner* — Thomas H Henry
(74) *Attorney, Agent, or Firm* — Lerner David LLP (57) ABSTRACT

A method of challenge generation comprises the steps of collecting gameplay telemetry data comprising values for one or more game parameters, from a plurality of users, selecting an in-game scenario for which telemetry data has been collected, for one or more selected game parameters, identify a value that does not prevent success in the in-game scenario, and generate a user challenge to succeed in the in-game scenario whilst generating a respective value for the one or more selected game parameters, the or each respective value having a respective selected relationship to the identified values of the one or more selected game parameters.

14 Claims, 3 Drawing Sheets

(56) References Cited

U.S. PATENT DOCUMENTS

2017/0259177 A1* 9/2017 Aghdaie ............... G06Q 30/02
2018/0147493 A1   5/2018 Cohen et al.

OTHER PUBLICATIONS

Combined Search and Examination Report for Application No. GB1903644.1, dated Aug. 22, 2019, pp. 1-7.
Communication pursuant to Article 94(3) EPC for European Application No. 20160600.1 dated Feb. 17, 2022. 7 pgs.

* cited by examiner

SYSTEM AND METHOD OF CHALLENGE GENERATION

CROSS-REFERENCE TO RELATED APPLICATION

The present application claims priority from United Kingdom Patent Application No. 1903644.1, filed on Mar. 18, 2019, the disclosure of which is hereby incorporated herein by reference.

BACKGROUND OF THE INVENTION

Field of the Invention

The present invention relates to a system and method of challenge generation.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Many videogames comprise different modes of play, such as a single-player or 'story' mode, or a multiplayer mode (whether those other players are real people, non player characters (so-called 'bots') or a mixture of the two.

Such modes allow for a variety of game play, but eventually there is a risk that a user may either complete the story mode and no longer feel a need to revisit it, or find the multiplayer experience repetitive.

This problem can be mitigated by developers producing more single or multiplayer content, but this can be costly to produce, and if provided as paid-for content, it may be unpalatable to the user.

Consequently there is a need for the ability to provide new activities to a user with little or no further developer input.

The present invention seeks to address or mitigate that need.

SUMMARY OF THE INVENTION

In a first aspect, a method of challenge generation is provided in accordance with claim 1.

In another aspect, a challenge generation system is provided in accordance with claim 13.

Further respective aspects and features of the invention are defined in the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

A system and method of challenge generation are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Embodiments of the present invention generate random challenges that are nevertheless achievable with the game. The random nature of the challenges is constrained to what is achievable (i.e. possible) within the game as determined from player telemetry, as explained later herein. By using player telemetry to explore a variety of possible approaches to a game, embodiments of the present invention identify player behaviors (such as actions and choices) that occurred when typically a minority of players succeeded in an in-game scenario (such as a map region, level, race, boss battle, quest or the like). Typically the smaller the minority of players involved, the more difficult (or novel) the challenge.

Figure 1:
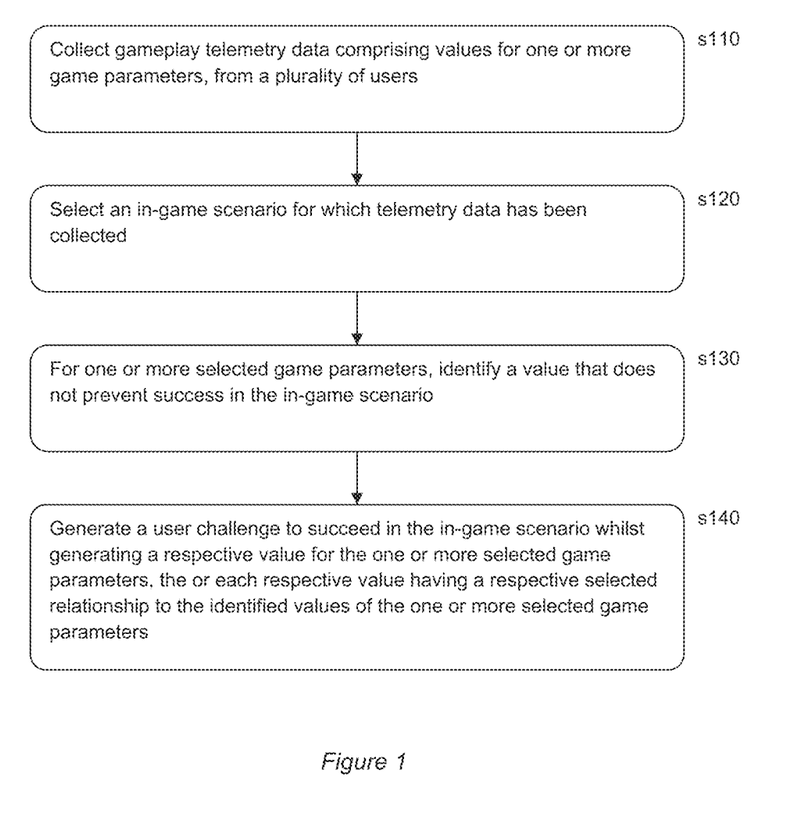
FIG. 1 is a flow diagram of a method of challenge generation, in accordance with embodiments of the present invention.

Accordingly, and referring now to the drawings, wherein like reference numerals designate identical or corresponding parts throughout the several views, in FIG. 1 a method of challenge generation is provided.

In a first step 110, gameplay telemetry data comprising values for one or more game parameters is collected from a plurality of users.

Figure 2:
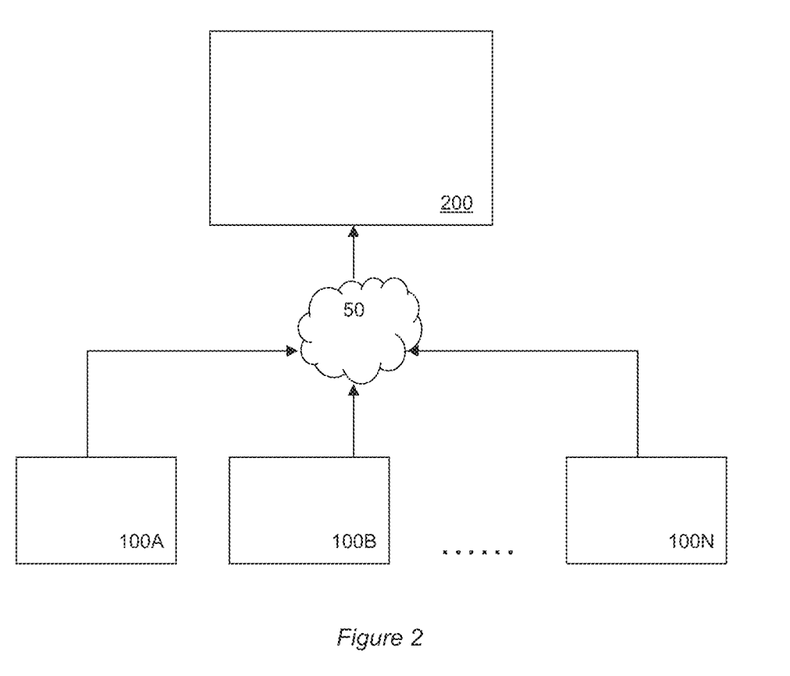
FIG. 2 is a schematic diagram comprising a challenge generation system, in accordance with embodiments of the present invention.

Referring also to FIG. 2, each of the plurality of users has a client device 100A, 100B, 100N, for example an entertainment device such as the Sony PlayStation 4®.

The client devices record the one or more game parameters during gameplay, and transmit these as gameplay telemetry data, in any suitable manner, via a network such as the Internet 50 to a challenge generation server 200.

The telemetry data may be transmitted live (i.e. game parameters are transmitted as values are created or changed), or may be transmitted periodically, for example upon the successful completion of an in game scenario. Alternatively the telemetry data may be transmitted as a mixture of these. Optionally telemetry data transmitted live to the challenge generation server by a user (i.e. by their client device) may collated periodically, for example upon successful completion of an in game scenario.

The step of transmitting game parameters as telemetry data is independent of the nature of the game parameters, which may vary according to the individual game. However a non-limiting example of such game parameters include the performance of a predetermined action, damage dealt, elapsed time, score, event, and the like.

In turn, non-limiting examples of the performance of a predetermined action include reaching a predetermined location or locations, collecting a predetermined item or items, using a predetermined weapon or weapons, interacting with one or predetermined objects and/or non-player characters, and the like.

Similarly, non-limiting examples of damage dealt include damage dealt either in a single action or cumulatively, damage dealt to a single target object and/or non-player character either in a single action or cumulatively, damage dealt using a predetermined weapon, item or move either in a single action or cumulatively, and the like.

Similarly, non-limiting examples of elapsed time include the time taken to complete an overall in game scenario, or to reach predetermined criteria relating to other examples above such as reaching a predetermined location, inflicting a predetermined level of damage, or performing an action a predetermined number of times.

Similarly, non-limiting examples of a score include treasure collected, distance travelled, foes been, rounds won, and the like.

Similarly, non-limiting examples of events include things that occur within the game as a consequence of the player's interaction with that game, rather than parametric descriptions of game play as such. Hence non-limiting examples may include detection of the player by a guard, completion of a puzzle, the survival (or death) of a non-player companion, levelling up of the player, the completion of a quest (where this is distinct from an in-game scenario, which itself may be a quest), and the like.

A further non-limiting example of such game parameters include damage received, in-game resource cost, and the like. These parameters can be indicative of the effective penalty associated with successful completion of an in game scenario, typically but optionally in association with one of the other parameters. Hence for example using a sword to kill a boss may result in more damage being received than using a gun to kill the boss, because success with a sword is more difficult and likely to incur more damage.

Non-limiting examples of damage received include loss of health or number of health units or health regeneration units consumed, loss of shield strength, armor strength, magical strength or other damage resistance property or the number of corresponding units or regeneration units consumed, and the like.

Non-limiting examples of in-game resource cost include number of fighting units lost, amount of territory lost, amount of treasure lost, amount of influence or goodwill with non-player characters lost, in-game time taken, and the like.

In a second step s120 of the method, an in-game scenario is selected for which telemetry data has been collected. As noted previously, examples of in game scenarios include but are not limited to a map region, level, race, boss battle, quest or the like. The in-game scenario may be selected at random, or may be selected by the game developer or publisher, or optionally may be selected by a user for a group of friends. The target population of users for a challenge based on the in game scenario may be all users, a geographical subset of users, an age subset of users, a group of friends maintained using a friendship association internal or external to the game, a clan or guild maintained using a clan or guild association internal or external to the game, a subset of users of a particular in-game character class or in-game skill level, a subset of users equipped with particular in-game items and/or or abilities, or an individual user.

In each case, the selection may be constrained to in-game scenarios that have been accessed or are accessible by a threshold proportion of the target population of users, so that at least that threshold proportion can access the resulting challenge.

To provide a non-limiting example for the purposes of subsequent explanation, the in-game scenario may be the defeat of a particular boss.

In third step s130 of the method then comprises for one or more selected game parameters, identify a value that does not prevent success in the in-game scenario.

The game challenge server will have recorded values for one or more selected game parameters, and also whether a user was successful within the in-game scenario (optionally, the values for the parameters may only be recorded if a user is successful within the in-game scenario).

Figure 3:
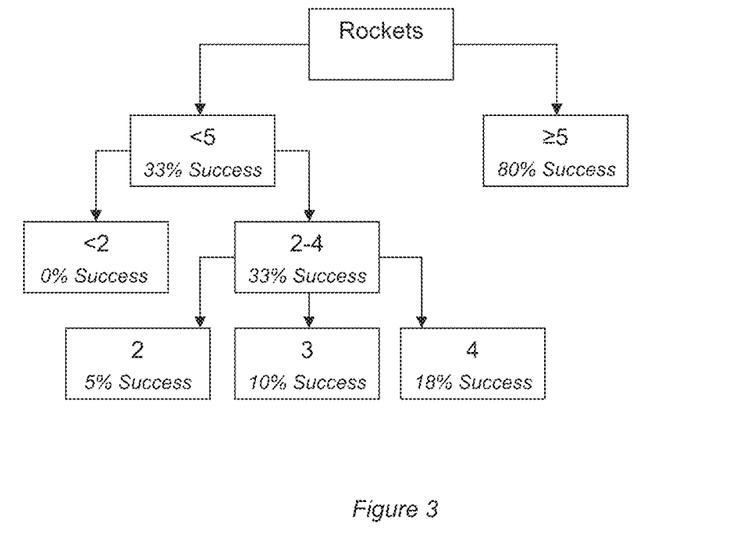
FIG. 3 is a schematic diagram of an entertainment device operable as either a client or server of a challenge generation system, in accordance with embodiments of the present invention.

Referring now also to FIG. 3, the server may then calculate what proportion of successful outcomes are associated with respective values of an in-game parameter. FIG. 3 shows values for a game parameter related to the number of rockets fired by the user (for example from a bazooka) when fighting the boss in the example scenario.

The values may be identified for example using any suitable decision tree, such as for example a conditional inference tree. Conditional inference trees recursively perform univariate splits of the relevant variable (such as the number of rockets fired) based on values of a set of covariates (such as success rate).

In order to provide a challenge, optionally a threshold success rate may be chosen, such as for example 50%, 40%, 30%, 20% or 10%. The smaller the threshold, typically the harder the challenge. In other words, for one or more selected game parameters, identify a value that is not associated with a proportion of success in the in-game scenario at or above a predetermined threshold, or similarly identify a value that is associated with a proportion of success in the in-game scenario at or below a predetermined threshold.

In FIG. 3, it can be seen that users who fired five or more rockets succeeded 80% of the time in defeating the boss. As the success rate is above the threshold, optionally further exploration of this branch of the tree may be curtailed.

Meanwhile users who fired fewer than five rockets succeeded 33% of the time. Hence given the smaller proportion at this level of the tree, this branch may be explored further even if this success rate is above the threshold.

In this case a further division reveals that players who fired between two and four rockets succeeded 33% of the time, whilst those who fired fewer than two rockets (i.e. one or zero rockets) never succeeded.

Consequently it can be seen that values of fewer than two rockets are associated with zero success. Until a user succeeds with fewer than two rockets, it is assumed that these values prevents success in the in-game scenario, and so will not be chosen for a challenge. Clearly in the case where parameter values for unsuccessful attempts are not recorded, then these values of fewer than two rockets would automatically be excluded from the tree. Hence in this latter case (or in any case where there is no explicit association with zero success), optionally any value outside the effective parameter value range associated with at least one success may be assumed to prevent success.

If a threshold success rate has been chosen, then a node on the tree may be chosen that is closest to the threshold success rate, and optionally closest above if the threshold success rate is treated as a minimum success rate.

Hence for example if the minimum success rate has been set at 20%, then it can be seen that the node corresponding to players who fired between two and four rockets is the closest option above the minimum success rate; in this case, identifying a particular number of rockets to use may be considered over-specific. However, if the threshold success rate is treated as a target or a maximum rather than a minimum, then optionally specifying the use of exactly four rockets may be the closer to that target as a suitable challenge.

Having identified a node in the decision tree, or similarly identified a correlation between parameter value and success rate, using any suitable technique, close to and optionally above a target value for the success rate, that parameter value may form the basis for the generation of a user challenge. It will be appreciated from the example in FIG. 3 that a 'value' may be a specific value, or a range of values, as appropriate.

It will be appreciated that the success rate is that of the players whose recorded values are being evaluated. As noted above, the in-scenario may be chosen responsive to particular subsets of players. Accordingly, optionally the parameter values and success rates used to identify one or parameter values may be based upon corresponding subsets of players. Hence for example if a challenge is being set for players under 12, then optionally the parameter values may be selected based upon the success of only other players under 12. Similarly if a challenge is being set for players of a particular character class, then optionally the parameter values may be selected based upon the success only of other players of that character class. Finally, if a challenge is being set for a particular individual player, then optionally the parameter values may be based upon the success only of other players with similar in-game profiles to the individual player; in this case, developers may select those elements of the profile that are important to defining the similarity of players; for example character class or skill level might be important, whereas in-game wealth might not.

Hence more generally the user challenge may be generated for a target population of users based on telemetry data from a subset of the plurality of users, the subset being selected according to one or more similarity criteria with respect to the target population of users.

Subsequently, a fourth step s140 of the method is to generate a user challenge to succeed in the in-game scenario whilst the user generates a respective value for the one or more selected game parameters, the or each respective value having a respective selected relationship to the identified values of the one or more selected game parameters.

In the explanatory example, the identified value is 2-4 for the number of rockets fired. In this case, it will be understood that the minimum threshold of 20% that was set has influenced the identified value, as this corresponds to the lowest success rate above the 20% threshold.

However as noted above it will be appreciated that the use of such a minimum target threshold is optional; for example the lowest value having a non-zero success rate may be chosen (although it may be recognised that this is likely to produce a very hard challenge).

If more than one identified value is to be used, then typically a success rate is identified for a combination of values from the two parameters. For example it may be a success rate for number of rockets AND damage received. In this case for example it may be that whilst 33% of players were successful when firing 2-4 rockets regardless of damage taken, only 10% of players were successful without taking any damage, and the range of damage taken by the remaining 23% of players very widely from minimal damage to near death.

Consequently, it may be found (for example by use of a conditional inference tree) that for example 21% of players were successful when firing 3-5 rockets whilst taking less than 25% damage. This may then be chosen as the combination of values that produces a success rate closest to the minimum threshold in the example.

It will be appreciated that in principle any parameter can be chosen as the first or the second parameter. However, optionally the first parameter can relate to a specific behavior (such as performance of a predetermined action, damage dealt, elapsed time, score, event, and the like), whilst the second parameter can relate to a specific penalty (such as damage received, in-game resource cost, and the like).

In either case, the challenge generation server then uses a challenge generation framework to create a challenge both in a language readable to the user, and separately in a language readable to form a form usable by the challenge generation server and/or the client devices.

Generating the challenge in a readable language involves the provision of stock sentences such as "In <scenario name>, use <relative selected relationship> <identified parameter value> <parameter name> to <scenario outcome>".

In the present example, this may result in the challenge sentence "In <the boss fight> use <between> <2-4> <rockets> to <defeat the boss>" (the < and > markers simply delineate the fields and would not be in the final sentence presented to the user).

In a challenge based on a variable value such as in the example above, different selected relationships may include for example 'fewer than', 'more than', 'between', and 'exactly'.

Meanwhile in challenges based on other parameters, such as reaching a specific point or performing a particular action, the relative selected relationship may for example be binary, such as to 'reach' or 'avoid' a location or to 'perform' or 'avoid' an action.

Hence it will be appreciated that different challenges will use different stock sentences. Consequently different parameters may be associated with different sentence types and hence different challenge types. Thus for example another stock sentence may be "Can you complete <scenario name> without losing <identified parameter value> units of <penalty related parameter>?", which may generate "Can you beat <the boss fight> without losing <25> units of <health>?"

It will also be appreciated that natural language substitutions can be used for certain parameter values; hence for example "without losing <0> units of <health>" could be rephrased as "without losing any health".

Once a developer has provided stock sentences for the various parameter types, no further input may be required to generate challenges, for example on a daily basis for a target population of players. As noted above, the target population may comprise all players of the game, or any number of permutations down to individual players. It will be appreciated that it would not be feasible for developers to manually create daily challenges for small groups or individual players.

The above example related to exhibiting behaviour that was also exhibited by fewer than a threshold proportion of users. However, this is not the only format of challenge possible.

More generally, there are at least four basic formats for a challenge;

i. The first is to succeed whilst exhibiting a behaviour also exhibited by fewer than a threshold proportion of users.

ii. The second is to succeed whilst avoiding a behaviour also avoided by fewer than a threshold proportion of users.

These first two formats involve replicating an aspect of gameplay shown by typically a minority of players.

iii. The third is to succeed whilst avoiding a behaviour that was exhibited by more than a threshold proportion of users.

iv. The fourth is to succeed whilst exhibiting a behaviour that was avoided (not exhibited) by more than a threshold proportion of users.

These second two formats involve rejecting an aspect of gameplay shown by typically a majority of players.

Hence optionally whilst the step of generating a user challenge may comprise requiring a user to reach or set a respective identified value for one or more selected game parameters, where that identified value was reached or set by less than a threshold proportion of users who were successful in the in-game scenario, similarly optionally the step of generating a user challenge may comprise requiring a user to not reach or not set a respective identified value for one or more selected game parameters, where that identified value was not reached or not set by less than a threshold proportion of users who were successful in the in-game scenario.

Similarly optionally whilst the step of generating a user challenge may comprise requiring a user to not reach or not set a respective identified value for one or more selected game parameters, where that identified value was reached or set by more than a threshold proportion of users who were successful in the in-game scenario, similarly optionally the step of generating a user challenge may comprise requiring a user to reach or set a respective identified value for one or more selected game parameters, where that identified value was not reached or not set by more than a threshold proportion of users who were successful in the in-game scenario.

Again in each case values are chosen that do not prevent success; hence when challenged to exhibit behaviors, the associated parameter values should be associated with a non-zero level of success amongst the plurality of players (i.e. the challenge should not require a behavior associated with or assumed to be associated with failure). Conversely when challenged to avoid behaviors, the associated parameter values should not be associated with 100% successes amongst the plurality of players (i.e. the challenge should not be to avoid a behavior essential to or assumed to be essential to success).

As discussed previously, challenge generation may be subject to additional precautions such as also setting a minimum threshold proportion of successful users. For example, using the first format, if a challenge to succeed using the number of rockets fired by fewer than 40% of the players is satisfied only by one node in which 5% of players were successful, then this may result in a harder challenge than was intended; therefore might also setting a minimum threshold of for example 20%, in this case the candidate challenge would no longer be generated.

As noted previously herein, the proportion of the plurality of players who succeed whilst exhibiting a particular behaviour, or conversely avoiding a particular behaviour, is indicative of the rarity or difficulty associated with that approach.

Consequently a difficulty setting for a challenge can be created by defining a proportion (or more generally a range of proportions) of the plurality of players who must have succeeded. Consequently, one or more candidate challenges may be generated based on values or value ranges of in-game parameters for which the proportion of successful players meets the defined proportion or range of proportions.

Hence for example 3 increasing difficulty settings could be created by defining a success range of 40-30% for 'easy' challenges, 30-20% for 'normal' challenges, and 20-10% for 'hard' challenges. The specific ranges or values may be decided by the developer or publisher, or whoever administers the challenge generation process.

Optionally, in order to provide variety the one or more in-game parameters may be selected at random or in sequence for use in challenges, and once used for a challenge may be blocked from use for a period of time or for a number of subsequent challenges, or may be placed at the back of the sequence or may be biased against within a random selection.

This encourages different aspects of gameplay to be used for successive challenges. It will be appreciated that where the selected one or more in game parameters comprise values that do not satisfy the difficulty range for a given challenge, the method may move on to the next parameter or parameter combination.

In embodiments of the present invention, the generated challenge may be associated with a unique identifier. This may then be used for example as an argument in a URL to route a user to a particular discussion forum dedicated to that challenge. This may then allow members of the target population to discuss the challenge.

The above described methods and techniques and corresponding systems found in embodiments of the present invention as described herein provide a means by which new activities can be generated automatically for a videogame, thereby extending the playable life of the videogame for users. It will be further appreciated that the present methods and techniques are distinct to and independent of the actual activities generated, which typically reflect the nature of the videogame to which the techniques are applied; hence for example a racing game will result in different challenges to a chess game or a fighting game, despite applications of the same techniques.

It will be appreciated that the above methods and techniques may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

Figure 4:
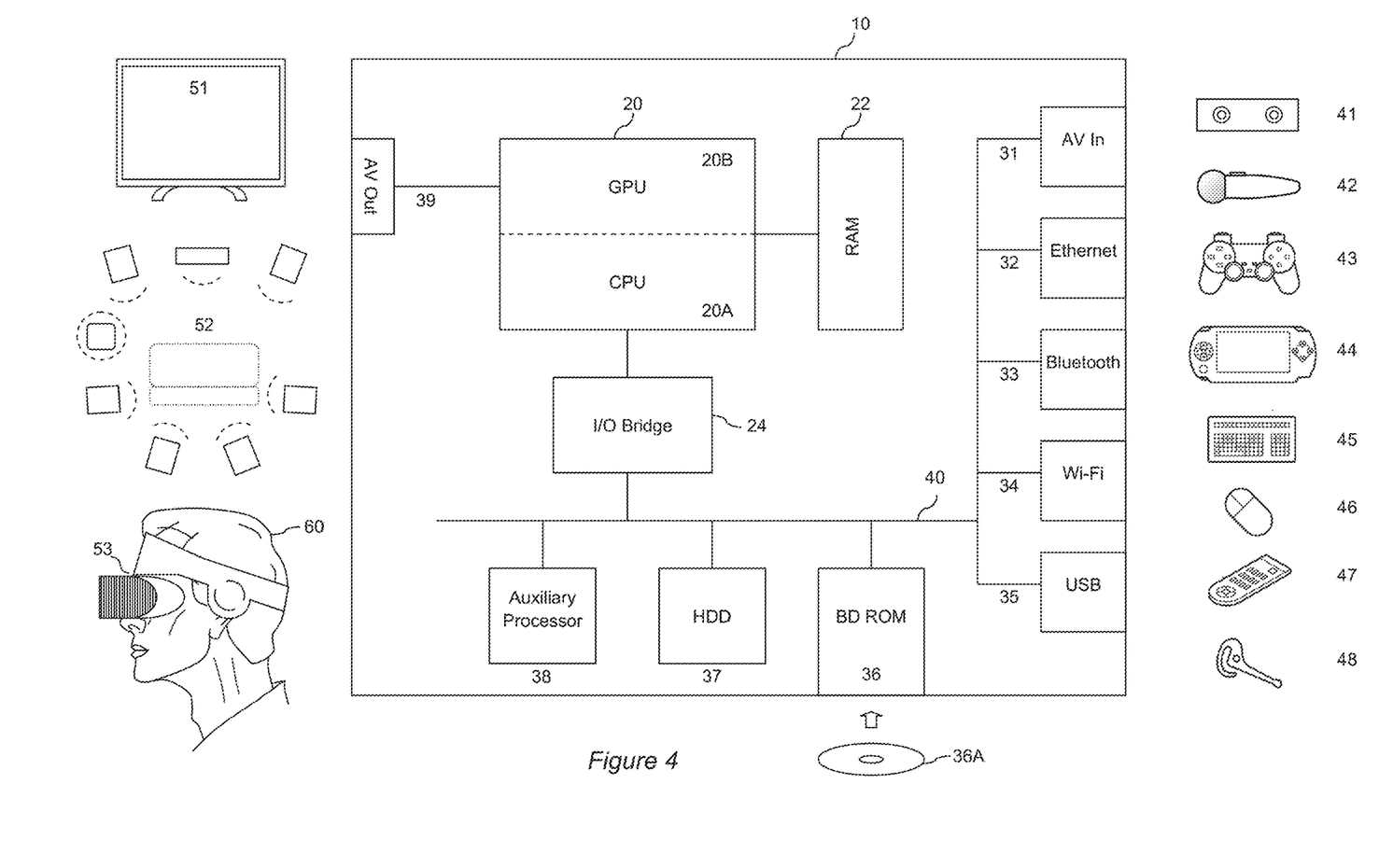
FIG. 4 is a schematic diagram of an entertainment device operable as a client or a server in accordance with embodiments of the present invention.

Referring to FIG. 4, an example of a suitable hardware is the Sony PlayStation 4 ®. Depending upon the software instructions provided, the PlayStation 4 ® may operate as a client 100 or as a challenge generation server 200.

In either case, a system unit 10 is provided, with various peripheral devices optionally connectable to the system unit.

The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi wireless link 34, or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move® and conventional handheld videogame controllers 43 such as the DualShock 4 ®; portable entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, generates video images and audio for output via the AV output 39. Optionally the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

In operation, the entertainment device defaults to an operating system such as a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features and to select games and optionally other content.

It will be appreciated that a general purpose computer or server may similarly act in the roles of client 100 or challenge generation server 200.

Accordingly, in an embodiment of the present invention, a challenge generation system (10, 200) comprises a receiver (such as for example an Ethernet® port 32, in conjunction with CPU 20A operating under suitable software instruction), operable to collect gameplay telemetry data comprising values for one or more game parameters, from a plurality of users. The system also comprises a scenario selection processor (such as CPU 20A) operable (for example under suitable software instruction) to select an in-game scenario for which telemetry data has been collected. The system further comprises a value selection processor (such as CPU 20A) operable (for example under suitable software instruction), for one or more selected game parameters, to identify a value that does not prevent success in the in-game scenario. Moreover, the system comprises a challenge generation processor (such as CPU 20A) operable (for example under suitable software instruction) to generate a user challenge to succeed in the in-game scenario whilst they generate a respective value for the one or more selected game parameters, the or each respective value having a respective selected relationship to the identified values of the one or more selected game parameters.

It will be apparent to a person skilled in the art that variations in the components and operations of the above system, corresponding variations in the methods and techniques described and claimed herein are considered within the scope of the present invention, including but not limited to:

the challenge generation processor being operable to generate a user challenge for a target population of users based on telemetry data from a subset of the plurality of users, the subset being selected according to one or more similarity criteria with respect to the target population of users;

the challenge generation processor being operable to define the difficulty of a challenge by the proportion of the plurality of users who have succeeded in the in-game scenario whilst generating a respective value for the one or more selected game parameters, the or each respective value having the respective selected relationship to the identified values of the one or more selected game parameters;

the challenge generation processor being operable to generate a plurality of challenges of increasing difficulty;

the challenge generation processor being operable to generate a user challenge that requires a user to reach or set a respective identified value for one or more selected game parameters, where that identified value was reached or set by less than a threshold proportion of users who were successful in the in-game scenario;

the challenge generation processor being operable to generate a user challenge that requires a user to not reach or not set a respective identified value for one or more selected game parameters, where that identified value was not reached or not set by less than a threshold proportion of users who were successful in the in-game scenario;

the challenge generation processor being operable to generate a user challenge that requires a user to not reach or not set a respective identified value for one or more selected game parameters, where that identified value was reached or set by more than a threshold proportion of users who were successful in the in-game scenario;

the challenge generation processor being operable to generate a user challenge that requires a user to reach or set a respective identified value for one or more selected game parameters, where that identified value was not reached or not set by more than a threshold proportion of users who were successful in the in-game scenario;

a first selected parameter comprises one from the list consisting of performance of a predetermined action, damage dealt, elapsed time, score, and event; and a first or second selected parameter comprises one from the list consisting of damage received, and in game resource cost.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of challenge generation, comprising the steps of:
using a processor to control
collecting gameplay telemetry data electronically, the gameplay telemetry data comprising values for one or more game parameters, from a plurality of users;
selecting an in-game scenario for which the gameplay telemetry data from a threshold proportion of a target population of users has been collected;
for one or more selected game parameters, identifying a value that does not prevent success in the in-game scenario using the gameplay telemetry data that has been collected from the threshold proportion of the target population of users, wherein a first or second selected parameter comprises at least one of performance of a predetermined action, damage dealt, elapsed time, score, or event, and wherein the value is identified based on a calculated proportion of success associated with the value; and
generating a user challenge to succeed in the in-game scenario whilst generating a respective value for the one or more selected game parameters, each respective value having a respective selected relationship to the identified values of the one or more selected game parameters in which the user challenge is generated for the target population of users, the target population of users being one or more selected from
i. a geographical subset of users;
ii. an age subset of users;
iii. a subset of users of a particular in-game character class; and
iv. a subset of users equipped with particular in-game items and/or abilities,
wherein generating a challenge includes the processor using a challenge generation framework to create a challenge both in a language readable to a user and in a form useable by a challenge generation server and/or client devices.

2. The method of claim 1, comprising the step of
for one or more selected game parameters, identifying a value that is not associated with a proportion of success in the in-game scenario at or above a predetermined threshold.

3. The method of claim 1, in which the step of generating a user challenge comprises requiring a user to reach or set a respective identified value for one or more selected game parameters, where that identified value was reached or set by less than a threshold proportion of users who were successful in the in-game scenario.

4. The method of claim 1, in which the step of generating a user challenge comprises requiring a user to not reach or not set a respective identified value for one or more selected game parameters, where that identified value was not reached or not set by less than a threshold proportion of users who were successful in the in-game scenario.

5. The method of claim 1, in which the step of generating a user challenge comprises requiring a user to not reach or not set a respective identified value for one or more selected game parameters, where that identified value was reached or set by more than a threshold proportion of users who were successful in the in-game scenario.

6. The method of claim 1, in which the step of generating a user challenge comprises requiring a user to reach or set a respective identified value for one or more selected game parameters, where that identified value was not reached or not set by more than a threshold proportion of users who were successful in the in-game scenario.

7. The method of claim 1, where the first or second selected parameter comprises one from the list consisting of:
i. damage received; and
ii. in-game resource cost.

8. The method of claim 1, in which the user challenge is generated for the target population of users based on telemetry data from a subset of the plurality of users, the subset being selected according to one or more similarity criteria with respect to the target population of users.

9. The method of claim 1, in which the difficulty of a challenge is defined by the proportion of the plurality of users who have succeeded in the in-game scenario whilst generating a respective value for the one or more selected game parameters, each respective value having the respective selected relationship to the identified values of the one or more selected game parameters.

10. The method of claim 9, in which the step of generating a user challenge comprises generating a plurality of challenges of increasing difficulty.

11. A non-transitory computer readable medium having stored thereon computer executable instructions adapted to cause a computer system to perform the method of challenge generation, the method comprising the steps of:
collecting gameplay telemetry data electronically, the gameplay telemetry data comprising values for one or more game parameters, from a plurality of users;
selecting an in-game scenario for which the gameplay telemetry data from a threshold proportion of a target population of users has been collected;
for one or more selected game parameters, identifying a value that does not prevent success in the in-game scenario using the gameplay telemetry data that has been collected from the threshold proportion of the target population of users, wherein a first or second selected parameter comprises at least one of performance of a predetermined action, damage dealt, elapsed time, score, or event, and wherein the value is identified based on a calculated proportion of success associated with the value; and
generating a user challenge to succeed in the in-game scenario whilst generating a respective value for the one or more selected game parameters, each respective value having a respective selected relationship to the identified values of the one or more selected game parameters in which the user challenge is generated for the target population of users, the target population of users being one or more selected from
iv. a geographical subset of users;
ii. an age subset of users;
iii. A subset of users of a particular in-game character class; and
iv. A subset of users equipped with particular in-game items and/or abilities,
wherein generating a challenge includes the processor using a challenge generation framework to create a challenge both in a language readable to a user and in a form useable by a challenge generation server and/or client devices.

12. A challenge generation system, comprising:
a receiver operable to collect gameplay telemetry data electronically, the gameplay telemetry data comprising values for one or more game parameters, from a plurality of users;
a scenario selection processor operable to select an in-game scenario for which the gameplay telemetry data from a threshold proportion of a target population of users has been collected;

a value selection processor operable, for one or more selected game parameters, to identify a value that does not prevent success in the in-game scenario using the gameplay telemetry data that has been collected from the threshold proportion of the target population of users, wherein a first or second selected parameter comprises at least one of performance of a predetermined action, damage dealt, elapsed time, score, or event, and wherein the value is identified based on a proportion of success associated with the value; and a challenge generation processor operable to generate a user challenge to succeed in the in-game scenario whilst they generate a respective value for the one or more selected game parameters, each respective value having a respective selected relationship to the identified values of the one or more selected game parameters in which the user challenge is generated for the target population of users, the target population of users being one or more selected from
i. a geographical subset of users;
ii. an age subset of users;
iii. a subset of users of a particular in-game character class; and
iv. a subset of users equipped with particular in-game items and/or abilities, wherein generating a challenge includes the processor using a challenge generation framework to create a challenge both in a language readable to a user and in a form useable by a challenge generation server and/or client devices.

13. A challenge generation system according to claim 12, in which the challenge generation processor is operable to generate a user challenge for the target population of users based on telemetry data from a subset of the plurality of users, the subset being selected according to one or more similarity criteria with respect to the target population of users.

14. A challenge generation system according to claim 12, in which the challenge generation processor defines the difficulty of a challenge by the proportion of the plurality of users who have succeeded in the in-game scenario whilst generating a respective value for the one or more selected game parameters, each respective value having the respective selected relationship to the identified values of the one or more selected game parameters.

* * * * *